United States Patent [19]

Stevenson et al.

[11] Patent Number: 5,746,961
[45] Date of Patent: May 5, 1998

[54] METHOD FOR ENHANCEMENT OF THE SURFACES OF MOLDED PLASTIC PRODUCTS

[75] Inventors: Michael H. Stevenson, Sedona; Robert A. Reeves, Cottonwood, both of Ariz.

[73] Assignee: Michael J. Stevenson, Sedona, Ariz.

[21] Appl. No.: 566,906

[22] Filed: Dec. 4, 1995

[51] Int. Cl.$^6$ ................................................ B29C 45/00
[52] U.S. Cl. .................... 264/255; 264/300; 264/301; 264/310; 264/328.16; 106/218
[58] Field of Search ........................... 264/255, 301, 264/310, 328.16, 328.1, 300, DIG. 69; 106/38.22, 38.24, 38.25, 38.6, 38.7, 38.8, 218

[56] References Cited

U.S. PATENT DOCUMENTS

| | | | |
|---|---|---|---|
| 4,154,789 | 5/1979 | Delacoste | 264/255 |
| 4,239,796 | 12/1980 | Shanoski et al. | 264/255 |
| 4,252,762 | 2/1981 | Stevenson | 264/255 |
| 4,282,285 | 8/1981 | Mohiuddin | 264/255 |
| 4,356,230 | 10/1982 | Emanuel et al. | 264/255 |
| 4,389,454 | 6/1983 | Horacek et al. | 264/255 |
| 4,499,235 | 2/1985 | Verwer et al. | 264/255 |
| 4,548,779 | 10/1985 | Steinberg et al. | 264/255 |
| 4,681,712 | 7/1987 | Sakakibara et al. | 264/255 |
| 4,980,107 | 12/1990 | Falline et al. | 264/255 |
| 4,980,113 | 12/1990 | Cummings et al. | 264/255 |
| 5,035,849 | 7/1991 | Uemura et al. | 264/255 |
| 5,164,127 | 11/1992 | Boeckeler | 264/255 |
| 5,304,332 | 4/1994 | Richart | 264/255 |

FOREIGN PATENT DOCUMENTS

| | | | |
|---|---|---|---|
| 562716 | 9/1993 | European Pat. Off. | 264/255 |
| 48-42211 | 12/1973 | Japan | 264/255 |
| 917844 | 2/1963 | United Kingdom | 264/255 |

*Primary Examiner*—Karen Aftergut
*Attorney, Agent, or Firm*—Robert E. Strauss

[57] ABSTRACT

An enhancement composition and a method for its use in a molding process. The enhancement composition is applied to the interior surfaces of the mold cavity used in a molding process such as blow molding, injection molding, thermoforming or rotational molding. The enhancement composition is applied prior to closing of the mold and molding of the plastic article. The enhancement composition comprises a liquid carrier containing up to about 50 weight percent of enhancement solids which comprise a mixture of an enhancement solid such as particles of varied thermoplastic and thermosetting resins, metal flakes, glass beads, carbon, graphite, etc., and a binder solid which can be a hydrocarbon resin, wax, rosin or terpene base resin. The invention provides for almost unlimited modification of the surfaces of molded plastic products, offering the plastics fabricator the ability to mold products having very specialized surface properties with a low cost structural polymer, e.g., a product molded of low cost, low density polyethylene having the surface characteristics of Teflon.

21 Claims, No Drawings

METHOD FOR ENHANCEMENT OF THE SURFACES OF MOLDED PLASTIC PRODUCTS

BACKGROUND OF THE INVENTION

1. Field of Invention

This invention relates to the modification of the surfaces of molded plastic articles and, in particular, to a composition and method for its use in the modification of surfaces of molded plastic articles.

2. Brief Description of the Prior Art

Molded plastics have various structural and surface limitations and imperfections which result from the election of the molding resin, or which are inherent in the molding process. In many applications, polymers having the desired surface properties lack the necessary mechanical properties or are often too costly for the particular product. To illustrate, polyethylene is a very economical molding resin, however, the surfaces of molded polyethylene products are not receptive to coatings or adhesives. Other polymers, notably the fluoroplastics, have remarkable non-adhesive properties, but are too costly, or lack sufficient structural strength for many applications.

Plastic articles are molded from plastic resin by various molding processes such as blow molding, injection molding, thermoforming and rotomolding. In the blow molding process a plastic parison is heated and blown against the interior walls of the closed halves of a mold. The split halves of the mold are separated and the cooled product is ejected. In an injection molding process, molten resin is injected under high pressure into a mold formed of split halves which are retained together by a clamping mechanism. After injection of the molten resin, the mold is cooled, opened and the molded product is ejected. In thermoforming, a sheet or film of plastic is heated to its softening point and is forced by mechanical or pneumatic pressure against a mold, cooled and ejected. In rotomolding, particles of the molding resin are charged into a closed mold which is tumbled on two perpendicular axes and heated in an oven to form a hollow-form product.

In the rotomolding process, it is desirable to use large particles of the resin to achieve maximum strength and chemical resistance. The surfaces of products molded from the larger particles of resin, however, have blemishes such as pits and bubbles, and the final rotomolded product is often a compromise between the desired strength and appearance. In all the molding processes, the shape or configuration of the final product is often dictated by the necessary draft angles and minimum curvatures that can be tolerated in these processes, and articles having very sharply angled walls and minimum curvatures are often not attainable.

OBJECTIVES OF THE INVENTION

It is an objective of this invention to provide a composition effective in modifying the surfaces of molded plastic articles.

It is an additional objective of this invention to provide a method for modification of the surfaces of molded plastic articles.

It is also an objective of this invention to enhance the surfaces of molded plastic articles.

It is likewise an objective of this invention to provide a method for the molding of articles from plastics having the mechanical properties of one plastic and the surface properties of one or more dissimilar plastics.

It is further objective of this invention to provide improvements in rotational molding permitting the fabrication of products having structural and surface properties not previously attainable.

It is yet another objective of this invention to provide for enhancement of the appearance and finish of surfaces of rotationally molded products.

It is likewise an objective of this invention to enhance the surface of rotationally molded products with properties and characteristics dissimilar to those of the polymer used for the structure of the product.

BRIEF STATEMENT OF THE INVENTION

This invention comprises an enhancement composition and a method for its use in a molding process. The enhancement composition is applied to the interior surfaces of the mold cavity used in a molding process such as blow molding, injection molding, thermoforming or rotational molding. The enhancement composition is applied prior to closing of the mold and molding of the plastic article. The enhancement composition comprises a liquid carrier containing up to about 50 weight percent of enhancement solids which comprise a mixture of an enhancement solid such as particles of varied thermoplastic and thermosetting resins, metal flakes, glass beads, carbon, graphite, etc., and a binder solid which can be a hydrocarbon resin, wax, rosin or terpene base resin. The invention provides for almost unlimited modification of the surfaces of molded plastic products, offering the plastics fabricator the ability to mold products having very specialized surface properties with a low cost structural polymer, e.g., a product molded of low cost, low density polyethylene having the surface characteristics of Teflon.

DESCRIPTION OF PREFERRED EMBODIMENT

This invention comprises a composition and method for modification of the surfaces of molded plastic products. The invention can enhance the appearance of plastic products by the reduction or complete elimination of surface blemishes such as pits, bubbles and the like in molded products. The invention can also provide for grafting of the surface properties of one polymer onto articles formed of a dissimilar polymer.

The method of the invention comprises coating of all or a portion of the interior surfaces of the mold to be used in the molding process with the enhancement composition prior to molding of the product. The invention is applicable, generally, to most molding processes including blow molding, injection molding, thermoforming and rotomolding. In all of these applications, the heated resin is forced against a mold face having an intaglio pattern of the desired configuration for the molded article. In blow molding, injection molding and rotational molding, the mold is formed of two or more split portions which are retained closed during the molding process. In blow molding, a parison is formed of the heated plastic and split halves of a mold are closed about the parison which is expanded or blown against the interior walls of the mold cavity. In injection molding, the molten resin is injected at high pressure into a mold, also formed of split halves, which are closed and retained together by a clamping mechanism. In rotational molding, resin particles are charged to the mold, the mold halves are closed, and the mold is tumbled by rotation about two perpendicular axes in a heated oven to cause the polymer particles to coalesce into a hollowform product. In thermoforming, a sheet or film of plastic is heated to its softening point and is forced against the wall of a mold by mechanical or pneumatic pressure.

The invention is applied to any of the various molding processes by coating all or a selected portion of the surfaces of the mold with the enhancement composition of the invention. While various coating techniques can be used, one method which is universally applicable to all of the molding processes is to spray the enhancement composition against the interior surfaces of the mold halves when the mold is open, e.g., after ejection of the molded article and prior to commencement of the successive molding cycle. In other applications, the enhancement composition can be brushed or rolled onto the mold surfaces.

Alternatively, the enhancement composition can be applied to a sheet carrier such as a transfer sheet of plastic film or of consolidated or woven fibers of various origin, e.g., polyester, cellulose, etc., and the resulting transfer can be physically applied to the selected interior surface or surfaces of the mold cavity to transfer the enhancement composition from the film carrier to the mold surfaces.

The enhancement composition useful in the invention comprises a liquid suspension of selected enhancement solids dispersed in a suitable liquid carrier. The liquid carrier is used in amounts from about 35 to 80 weight percent, most preferably from about 50 to 75 weight percent, of the composition, and the balance of the enhancement composition comprises particulate solids of a mixture of an enhancement solid and a binder solid.

Various binder solids can be used including rosins, aromatic and aliphatic hydrocarbon resins and waxes, including synthetic hydrocarbon waxes and oxidized synthetic waxes and terpene based resins. The proportion of the binder solid and the enhancement solid of the particulate solids in the enhancement composition can be widely varied from about 5 to about 95 weight percent of each. Preferably, the enhancement mixture comprises from 70 to 90 percent of the enhancement solid, and from 10 to about 30 weight percent of the binder solid, based on the weight of the particulate solids of the enhancement composition.

The particle size of the enhancement mixture can be varied, and particles passing screens 18 mesh U.S. series (1000 microns to submicron diameters), preferably 35 mesh (500 microns to submicron diameters) are useful. The maximum particle size useful in the invention is limited by the desired surface appearance, and the stability of the enhancement composition. The quality of the finish or appearance of the molded product depends to some extent on the fineness of the particles used in the enhancement mixture, with the finest particles providing the smoothest and most polished surface appearance.

The enhancement solid useful in the invention can be any thermoplastic or thermosetting polymer; metal flakes; glass beads; carbon; graphite; antistatic agents such as quaternary ammonium salts and esters of fatty acids; flame retardants comprising aluminum, phosphorous, and boron compounds; lubricants comprising hydrocarbon paraffins, metal stearates, fatty acids and fatty acid amides and esters and aliphatic alcohols and polyols; preservatives comprising copper, tin, antimony, ammonium, arsine and phthalimide compounds; polyvinyl chloride heat stabilizers comprising lead, barium, cadmium, zinc, phosphorus, nitrogen, tin and calcium compounds; etc.

The various thermoplastic and thermosetting solids which can be useful as enhancement solids in the invention include polymers such as polyphenylene sulfide, useful to impart flame-resistance to the surfaces of molded plastic articles; acetal homo- and co-polymers useful to impart hardness, smoothness, abrasion resistance, solvent resistance to the molded plastic articles; acrylic polymers useful to impart outdoor weatherability and chemical resistance to polymer plastic articles; alkyd polymers and alkyl polymers useful to impart dielectric strength, arc track and flame resistance for electrical applications to molded plastic articles; amino polymers useful to impart hardness, mar resistance, high heat deflection temperatures and electrical arc and track resistance to molded plastic articles; cellulose polymers useful to impart scuff resistance and acceptance for food contact to molded plastic articles; epoxy resins useful to impart chemical and solvent resistance to molded plastic articles; fluoroplastics useful to impart non-adhesiveness (low frictional character), flame resistance and chemical and solvent resistance to molded plastic articles; ionomer polymers useful to impart a heat seal surface and adhesiveness to foil to molded plastic articles; nitrile resins useful to impart low gas and water vapor transmission properties to molded plastic articles; nylons useful to impart strength, abrasion and solvent resistance to molded plastic articles; phenylene oxide based resins useful to impart water resistance and dielectric properties to molded plastic articles; partially hydrolyzed ethylene vinyl acetate copolymers to impart gas and water vapor impermeability to the surface of molded plastic articles; polystyrene useful to impart toughness and a coating receptive character to the surface of molded plastic articles; sulfone polymers useful to impart chemical resistance to molded plastic articles; polyurethane useful to impart abrasion and solvent resistance to molded plastic articles; and polyvinyl-chloride and polyvinylidene chloride useful to impart gas and water vapor impermeability to molded plastic articles.

In all of these applications, the invention is useful in imparting surface properties to plastic articles which are not characteristic of the polymer used for the structure of the molded plastic article, thereby providing the plastics fabricator with the ability to select a polymer for the structure of the article which has the optimum blend of cost and strength, while achieving a finished article having surface properties of quite dissimilar polymers, e.g., a fluoroplastic surface on an article molded principally of polyethylene.

Various colorants can also be used as the enhancement solid, thereby providing a desired surface appearance. Colorants which are useful include those containing inorganic pigments such as titanium dioxides (rutile, anatase), zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide (lithopones), cadmium mercury mixtures, cadmium sulfide or cadmium sulfoselenides, nickel and titanium dioxide mixtures, sodium, potassium or ammonium coordination compounds of ferri-ferrocyanide, ultramarine blues (a calcined mixture of china clay, sodium carbonate, silica, sulfur and reducing agents), cobalt aluminate (cobalt blues), chromium oxide, metal flake pigments such as aluminum, zinc, copper, bronze powders, metal silver pigments, pearlescent and iridescent flakes of basic lead carbonates, bismuth oxychlorides and titanium coated mica, etc. Various organic pigments which are useful include azo pigments, such as benzimidazolone pigments, pyrazolone pigments, copper phthalocyanine, quinacridones, anthraquinones, condensation pigments, tetra-chloroisoindolinones, carbon blacks, etc.

The liquid carrier is used in amounts from about 35 to 80 weight percent, most preferably from about 50 to 75 weight percent, of the composition and can be an inert inorganic solvent such as toluene, xylene, acetone, methylethyl ketone, naphtha, mineral oil spirits, methylene chloride, isopropanol, etc., or can be water with from 1 to about 5 weight percent of an ionic or non-ionic surfactant, effective to form a stable aqueous suspension of the particulate solids.

Examples of suitable non-ionic surfactants are ethylene oxide condensates of vegetable oils, alcohols, phenols, organic acids and hydroxy esters. Included in such compounds are castor oil, tall oil and linseed oil condensates of ethylene oxide having 5 to 70 weight percent of oxyethylene units. Other non-ionic surfactants include polyethylene aliphatic ethers such as polyoxyethylene lauryl ether, polyoxyethlene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide and N-lauryl-N-polyoxyethylene ethyl amine and the like; and polyoxyethylene thioethers such as polyoxyethylene n-dodecyl thioether.

Ionic surfactants which can be employed herein include anionic compounds obtained by sulfonation of fatty derivatives such as sulfonated tallow, sulfonated vegetable oils and sulfonated marine animal oils. Various sulfonated and sulfated fatty acid esters of mono- and polyvalent alcohols are also suitable such as a sulfated butyl ester of a fatty ester, sulfated fatty esters, etc.

The following examples will illustrate the invention and serve to demonstrate results obtainable therewith.

EXAMPLE 1

A hollowform tank of foamed polyethylene is prepared by rotational molding from a low density polyethylene which contains a blowing agent. The polyethylene is charged to the mold in the form of micropellets having an average particle diameter of 0.020 inch, and contains an internal blowing agent which foams the resin at its softening temperature. When the resin is charged to a mold with untreated internal surfaces, the product which is formed has an inferior surface which is characterized by small pits and blemishes. Additionally, the external edges of the article are rough and irregular. The inferior appearance of the surface of products molded of the foamed polyethylene has prevented commercial utilization of the foamed resin in rototational molding.

The preparation of the hollowform tank is repeated, however, the internal surfaces of the mold are coated with a layer of an enhancement solid of the invention which comprises 35 weight percent solids in toluene. The solids phase is a mixture of 75 weight percent microfine polyethylene, and 25 weight percent of a mixture of pentaerythritol ester of rosin and hydrogenated methyl ester of rosin. The coating is applied by spraying and is about 0.0001 to about 0.0005 inch thick.

The product produced from the mold sprayed with the enhancement solid has a surface free of pits and blemishes, with a polished appearance. The external edges of the article are even and sharply formed with no irregularities.

EXAMPLE 2

A mixture of thermoplastic resins obtained by grinding or recycled plastics and having a mixed composition of cross-linked polyethylene, oxidized and ultra-violet light decayed resins, and various pigments and colorants is charged to a mold which has been treated with the enhancement composition of the invention. The resin particles have an average diameter from about 1000 microns to less than one micron. The interior mold surfaces are coated with a film approximately 0.0001 inch thick of the enhancement composition by spraying the composition used in Example 1 onto the interior mold surfaces immediately prior to the molding step. The finished article removed from the mold has an unblemished surface free of pits. In contrast, the surfaces of articles rotationally molded from regrind resins is greatly inferior with many pits and blemishes and irregular external edges and corners.

EXAMPLE 3

A rotational mold is charged with particles of low density polyethylene particles passing a 20 mesh screen, corresponding to a maximum particle diameter 0.03 inch. The internal surfaces of the mold are coated with a film of the surface enhancer of the invention which is similar to that described in Example 1, with the exception that fluoroplastic (TEFLON) particles are substitute for the microfine polyethylene as the enhancement solids. The resultant article removed from the mold has the strength and resiliency of a polyethylene article, but has the surface properties of the fluoroplastic, including a high degree of non-adhesiveness and a low frictional characteristic.

EXAMPLE 4

A five gallon capacity bottle with an integral neck having an external thread finish, and useful as a solvent container is molded from low density polyethylene particles passing a 100 mesh screen (corresponding to a maximum particle diameter of 0.005 inch). The internal surfaces of the mold are coated with a first film, about 0.001 thick, of an enhancement composition containing partially hydrolyzed polyvinyl acetate as the enhancement solid, and a second film containing polyvinylidene chloride as the enhancement solid. Each composition contained solvent and binder solids in the same amounts described for the composition of Example 1.

The finished bottle discharged from the mold had a very smooth external surface with a neck finish characterized by sharp-edged threads with no imperfections. The bottle also had a high degree of vapor impermeability to oxygen, water vapor and solvent vapors, which exceeded that of low density polyethylene.

As previously mentioned, use of the enhancement composition of the invention provides a fabricator with an unlimited combination of structural and surface properties in finished articles. The invention also permits the molding of resins which have not previously been used successfully, such as regrind resins and micropellets with internal blowing agents.

The invention also provides improvements in molding in that it improves the flow of molding resin into tight corners with small radii, thereby permitting forming of products not usually obtained, such as rotationally molded products having external and internal threads. The enhancement coatings on the internal surfaces of the mold also have a high heat conductivity and accelerate the transfer of heat to the molding resin, thereby shortening cycle time of the molding process. Electrostatic charges which often build up on molding resin particles during rototational molding are eliminated when using the enhancement composition of the invention. Additionally, surfaces of articles molded using the enhancement composition resist blooming and chalking of colorants. The use of the enhancement composition also reduces air entrapment in the walls of the molded product.

It is believed that the enhancement solid forms an outer surface or skin on the molded product substantially entirely of the enhancement solid and that the enhancement solid also mixes with the molding resin during the molding step, so that at increasing depth into the wall of the molding product, the enhancement solid decreases, and the molding resin increases, in concentration.

The invention has been described with reference to the illustrated and presently preferred embodiment. It is not intended that the invention be unduly limited by this disclosure of the preferred embodiment. Instead, it is intended that the invention be defined by the means, and their obvious equivalents, set forth in the following claims.

What is claimed is:

1. A method for enhancement of a surface of a molded product formed by molding polyethylene in a mold against a heated mold surface with a face having an intaglio pattern of a desired configuration for said molded product which method comprises;
   a. coating at least a portion of said mold surface with an enhancement composition having mechanical and chemical properties consisting essentially of:
      (1) 50 to 75 weight percent of a non-oleaginous liquid carrier selected from the group consisting of inert organic solvents and water; and
      (2) 25 to 50 weight percent of enhancement solids comprising:
         i. 5 to 95 weight percent of particles of an enhancement solid selected from the group consisting of: thermoplastic and thermosetting polymer resins; metal flakes; glass beads; carbon; graphite; antistatic agents comprising quaternary ammonium salts and esters of fatty acids; flame retardants comprising aluminum, phosphorous and boron compounds; lubricants comprising hydrocarbon paraffins, metal stearates, fatty acids and fatty acid amides and esters, and aliphatic alcohols and polyols; preservatives comprising copper, tin, antimony, ammonium, arsine, and phthalimide compounds; and polyvinyl chloride heat stabilizers comprising lead, barium, cadmium, zinc, phosphorous, nitrogen, tin and calcium compounds; and
         ii. 95 to 5 weight percent of a binder solid selected from the group consisting of: rosins, aromatic and aliphthatic hydrocarbon resins and waxes, and terpene base resins; and
   b. forcing polyethylene against said heated mold surface coated with said enhancement composition to mold said polyethylene into said desired product configuration of said molded product while mixing said polyethylene with said enhancement composition; and
   c. extracting from said mold, said molded product having an external surface possessing said mechanical and chemical properties of said enhancement solid.

2. The method of claim 1 wherein said molding is rotational molding and said mold has multiple portions with interior mold faces which are closed to form a closed mold cavity and wherein said enhancement composition is coated on said interior mold faces prior to closing of said multiple portions of said mold, said mold portions are closed and particulate polyethylene is charged to said mold cavity and said mold is heated and rotated about two perpendicular axes simultaneously to mold said polyethylene into a hollow form molded product.

3. The method of claim 2 wherein particulate polyethylene particles having a maximum diameter less than 1000 microns are charged to said mold.

4. The method of claim 2 wherein reground polyethylene including varied and uncontrolled amounts of cross-linked, oxidized and UV-degraded polymer and additives and pigments is charged to said mold.

5. The method of claim 2 including the step of selecting as said particles of enhancement solid microfine polyethylene and wherein said surface of said molded product is enhanced by reduction in surface defects and blemishes.

6. The method of claim 2 including the step of selecting as said particles of enhancement solid ultrahigh molecular weight polyethylene and wherein said surface of said molded product is enhanced by reduction in surface defects and blemishes.

7. The method of claim 2 wherein said intaglio pattern has radii of curvatures less than 0.5 inch, and including the step of applying said enhancement composition as a coating over said intaglio pattern prior to said molding step.

8. The method of claim 2 wherein said intaglio pattern has depth relieved surfaces with shallow draft and including the step of applying said enhancement composition as a coating over said relieved surfaces prior to said molding step.

9. The method of claim 8 including the step of using a mold having an intaglio pattern of a pipe thread surface as said mold surface.

10. The method of claim 1 including the step of selecting as said particles of enhancement solid a polymer dissimilar to and having different mechanical and chemical properties than polyethylene, and wherein said molded product is enhanced by imparting said mechanical and chemical properties of said particles of enhancement solid to said external surface of said molded product.

11. The method of claim 10 including the step of selecting as said particles of enhancement solid a fluoroplastic and wherein said external surface of said molded product possesses non-adhesiveness properties of said fluoroplastic.

12. The method of claim 10 including the step of selecting as said particles of enhancement solid an acetal polymer and wherein said external surface of said molded product possesses hardness, smoothness and abrasion resistance of said acetal polymer.

13. The method of claim 10 including the step of selecting as said particles of enhancement solid an amino thermosetting resin and wherein said external surface of said molded product possesses hardness and electrical arc and track resistance of said amino thermosetting resin.

14. The method of claim 10 including the step of selecting as said particles of enhancement solid an epoxy resin and wherein said external surface of said molded product possesses chemical and solvent resistance of said epoxy resin.

15. The method of claim 10 including the step of selecting as said particles of enhancement solid a nylon polymer and wherein said external surface of said molded product possesses solvent and abrasion resistance of said nylon polymer.

16. The method of claim 10 including the step of selecting as said particles of enhancement solid a nitrile polymer and wherein said external surface of said molded product possesses gas and water vapor impermeability of said nitrile polymer.

17. The method of claim 10 including the step of selecting as said particles of enhancement solid an ethylene vinyl acetate copolymer and wherein said external surface of said molded product possesses gas and water vapor impermeability of said ethylene vinyl acetate copolymer.

18. The method of claim 10 including the step of selecting as particles of said particles of enhancement solid polystyrene and wherein said external surface of said molded product possesses toughness and a coating-receptive properties of said polystyrene.

19. The method of claim 10 including the step of selecting as said particles of enhancement solid a sulfone polymer and wherein said external surface of said molded product possesses chemical resistance of said sulfone polymer.

20. The method of claim 10 including the step of selecting as said particles of enhancement solid a polyurethane and wherein said external surface of said molded product possesses abrasion and solvent resistance of said polyurethane.

21. The method of claim 10 including the step of selecting as said particles of enhancement solid polyvinyl chloride or polyvinylidene chloride and wherein said external surface of said molded product possesses gas and water vapor impermeability of said polyvinyl chloride and polyvinylidene chloride.

* * * * *